United States Patent
Kondo (10) Patent No.: US 9,975,328 B2
(45) Date of Patent: May 22, 2018

(54) INKJET IMAGE-FORMING METHOD (71) Applicant: KONICA MINOLTA, INC., Chiyoda-ku, Tokyo (JP)

(72) Inventor: Ai Kondo, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days. days.

(21) Appl. No.: 15/548,584

(22) PCT Filed: Jan. 27, 2016

(86) PCT No.: PCT/JP2016/052343
§ 371 (c)(1),
(2) Date: Aug. 3, 2017

(87) PCT Pub. No.: WO2016/125656
PCT Pub. Date: Aug. 11, 2016

(65) Prior Publication Data
US 2018/0001620 A1    Jan. 4, 2018

(30) Foreign Application Priority Data

Feb. 5, 2015 (JP) ................................. 2015-021292

(51) Int. Cl.
*B41J 2/045* (2006.01)
*C09D 11/322* (2014.01)
*B41M 7/00* (2006.01)

(52) U.S. Cl.
CPC ......... *B41J 2/0451* (2013.01); *B41J 2/04508* (2013.01); *B41J 2/04586* (2013.01); *B41M 7/0081* (2013.01); *C09D 11/322* (2013.01)

(58) Field of Classification Search
CPC .. B41J 2/04508; B41J 2/0451; B41J 2/04586; B41J 2/155; B41J 2/2146; B41J 2/01; B41J 2/2107; B41J 2202/21; B41J 3/407; B41M 7/0081; B41M 7/009; B41M 5/0011; B41M 5/0023; B41M 3/00; B41M 5/0088; C09D 11/322; C09D 11/101; C09D 11/40;
(Continued)

(56) References Cited

U.S. PATENT DOCUMENTS 8,877,827 B2 * 11/2014 Takabayashi ............ C09D 4/00
520/1
2015/0274998 A1 * 10/2015 Kagata ...................... B41J 2/01
347/102

FOREIGN PATENT DOCUMENTS

JP       09024609 A       1/1997
JP       2005074956 A     3/2005

OTHER PUBLICATIONS

International Search Report corresponding to Application No. PCT/JP2016/052343; dated Apr. 5, 2016.

* cited by examiner

*Primary Examiner* — Jannelle M Lebron
(74) *Attorney, Agent, or Firm* — Cantor Colburn LLP (57) ABSTRACT

A line-head-type inkjet image-forming method includes ejecting a gel ink to a recording medium at a first coverage rate that is less than 100% and set to allow dots of newly ejected gel ink to unite with dots of the gel ink already landed on the recording medium. The gel ink contains a specific amount of a polymer dispersant based on the amount of the colorant and has a specific contact angle on the recording medium. The gel ink is ejected from nozzles so as to form dots with a diameter slightly larger according to the resolution of the image to be formed.

16 Claims, 1 Drawing Sheet (58) Field of Classification Search
CPC ..... C09D 11/30; C09D 11/023; C09D 11/033; C09D 11/54
See application file for complete search history.

INKJET IMAGE-FORMING METHOD

CROSS REFERENCE TO RELATED APPLICATIONS

This is the U.S. national stage of application No. PCT/JP2016/052343, filed on Jan. 27, 2016. Priority under 35 U.S.C. § 119(a) and 35 U.S.C. § 365(b) is claimed from Japanese Application No. 2015-021292, filed Feb. 5, 2015, the disclosure of which is also incorporated herein by reference.

TECHNICAL FIELD

The present invention relates to an inkjet image-forming method.

BACKGROUND ART

Generally, a line-head-type inkjet image-forming apparatus has an inkjet head having a plurality of nozzles arranged in one or more rows over the entire width of the image to be formed. The inkjet head is fixed, under which a recording medium such as a paper or fabric sheet is fed in a direction crossing the nozzle arrangement direction, while ink is ejected from the inkjet head to form the desired image. Such a line-head-type inkjet image-forming method is advantageous in terms of mass production of high-quality images.

On the other hand, such an image-forming method, in which the inkjet head is fixed relative to the recording medium being fed, can cause image defects such as stripes and uneven density when a failure occurs in any of the nozzles (such as deflected ejection of ink or ejection failure). If the ink used is a gel ink, the image defects can more easily occur because the gel ink has high pinning ability and thus less easily levels out than non-gel inks.

For example, if any one of the nozzles fails to eject the ink, a stripe-like blank (stripe defect) can appear in the resulting image. In the line-head-type inkjet image-forming method, a known technique to prevent the stripe defect includes increasing the amount of ejection of ink from a nozzle adjacent to the nozzle failing to eject ink or further increasing the dot diameter (e.g., refer to Patent Literatures 1 and 2).

CITATION LIST

Patent Literatures

Patent Literature 1: JP 09-024609 A
Patent Literature 2: JP 2005-074956 A

SUMMARY OF INVENTION

Technical Problem

The technique mentioned above, although effective in preventing stripe defects in line-head-type inkjet image-forming methods, requires special control of the ejection operation (e.g., expansion and contraction of piezoelectric devices) of only a few of many nozzles. This may make the control of ejection operation of each nozzle more complex and cause the special ejection operation to affect the control of ejection from other nozzles. Thus, there has been a demand for measures to prevent the image defects by simpler control.

The present invention provides a line-head-type inkjet image-forming method that makes it possible to more easily suppress the occurrence of stripe defects due to a failure of ejection of ink from nozzles when gel ink is used.

Solution to Problem

In a line-head-type inkjet image-forming method, the diameter of ink dots from each nozzle is sometimes set larger than the minimum necessary diameter and the coverage rate for each nozzle is sometimes set smaller according to the set dot diameter, in order to improve the productivity of image formation process, within ranges where the desired image quality can be obtained. The inventors have completed the present invention based on findings that the occurrence of stripe defects can be prevented using suitable dot diameters and that even when a nozzle failure occurs, controlling the coverage rate makes it possible to prevent the occurrence of image defects due to the nozzle failure.

The present invention provides an inkjet image-forming method including forming an image by ejecting a gel ink at a first coverage rate from a plurality of nozzles arranged along a first direction to a recording medium moving in a second direction crossing the first direction, wherein the first coverage rate is less than 100% and set to allow dots of newly ejected gel ink to unite with dots of the gel ink already landed on the recording medium. The gel ink includes a crystalline gelling agent, a colorant, and a polymer dispersant, the content of the polymer dispersant in the gel ink is from more than 20% by mass to 70% by mass based on the weight of the colorant, and the gel ink has a contact angle of 15 to 30° on the recording medium. The inkjet image-forming method also satisfies the formula shown below. In the formula, R is the resolution (dpi) of the image to be formed, and D is the diameter (μm) of ink droplet dots landed on the recording medium.

$$2.7 \leq D/(2.54 \times 10^4/R) \leq 3.5$$

Advantageous Effects of Invention

According to the inkjet image-forming method, the occurrence of image defects due to nozzle failure can be prevented by changing only the pace of ejection of ink from a nozzle or nozzles adjacent to the nozzle suffering ejection failure. According to the inkjet image-forming method, therefore, the occurrence of stripe defects due to a failure of ejection of ink from nozzles can be more easily suppressed in a line-head-type inkjet image-forming method using gel ink.

DESCRIPTION OF EMBODIMENTS

Hereinafter, an embodiment of the present invention will be described.

A gel ink is used in the inkjet image-forming method according to the embodiment. The inkjet image-forming method is what is called a line-head-type inkjet image-forming method. Specifically, the image-forming method includes the step of ejecting a gel ink at a first coverage rate from a plurality of nozzles arranged along a first direction to a recording medium moving in a second direction crossing the first direction (the printing step).

The first coverage rate is a coverage rate that is set to allow dots of newly ejected gel ink to unite with dots of the gel ink already landed on the recording medium. The expression "to allow dots to unite with dots" means that dots of the gel ink newly landed on the recording medium are, for example, allowed to come into contact or overlap with dots already provided on the recording medium or allowed to wet and spread on the recording medium, so that the dots newly landed are integrated with the dots already provided. The term "coverage rate" refers to the proportion (%) of pixels on which droplets of the gel ink from one nozzle are landed to all pixels in the pixel column allocated to the one nozzle.

The first coverage rate is any suitable percentage less than 100%. For example, the first coverage rate is a suitable percentage that is less than the maximum coverage rate and set, taking into account the wetting and spreading, to achieve the minimum dot diameter necessary to allow new dots to unite with the already provided dots. The first coverage rate can be suitably set depending on, for example, the diameter of dots of the gel ink ejected from each nozzle. Setting the dot diameter larger allows the first coverage rate to be smaller, which is preferred in view of image formation productivity. Setting the dot diameter smaller requires the first coverage rate to be larger, which is preferred in view of image quality improvement.

In this regard, the dot diameter is, for example, the size of dots formed after the ink droplets landed on the recording medium wet and spread. For example, in view of image formation productivity, the first coverage rate is set to 0.3 to 0.7 times the maximum coverage rate. More specifically, the first coverage rate is preferably from 35 to 65%, more preferably from 40 to 60%.

The recording medium is an object to which the gel ink is applicable by the line-head-type inkjet image-forming method. The recording medium is generally in the form of a sheet. Alternatively, however, the recording medium may be in any other form as long as the gel ink is applicable to the medium in the embodiment. Examples of the recording medium include a variety of printing coated paper sheets, metallized paper sheets, aluminum foil sheets, polyethylene terephthalate (PET) sheets, polypropylene (PP) sheets, wood-free paper sheets, cardboard sheets, art paper sheets, corrugated paper sheets, coated cardboard sheets, embossed paper sheet, and fabrics.

The recording medium is selected from objects having a contact angle of 15 to 30° with the gel ink. The contact angle can be determined using, for example, a commercially available contact angle meter. If the contact angle is too small, the gel ink may significantly smear, which may result in a granular image defect. If the contact angle is too large, dots of the gel ink may protrude from the surface of the recording medium, which may cause poor curing of the gel ink and insufficient adhesion of the dots to the recording medium. In view of image quality improvement, the contact angle is preferably from 18 to 28°, more preferably from 20 to 26°.

The gel ink preferably has a phase transition temperature. The phase transition temperature of the gel ink refers to the temperature at which the gel ink changes from liquid to solid. If the phase transition temperature is too low, ink ejection stability or pinning stability may fail to be achieved particularly in a high-temperature environment such as summer, which may affect the sensitivity. If the phase transition temperature is too high, turning the gel ink into an ejectable liquid state will require heating the inkjet recording apparatus to an excessively high temperature, which may increase the load on the head or ink supply system unit of the inkjet recording apparatus. From the above points of view, the phase transition temperature of the gel ink is preferably from 40° C. to less than 100° C., more preferably from 45 to 75° C.

The phase transition temperature (gelation temperature) can be determined from a viscoelasticity curve obtained using, for example, any of various rheometers (e.g., stress-controlled rheometers using a cone plate, such as Physica MCR series manufactured by Anton Paar GmbH). The viscoelasticity curve can be obtained by, for example, measuring the viscosity curve (temperature-dependent changes in dynamic viscoelasticity) of the ink in a sol state at different high temperatures and at a low shear rate. The gelation temperature can be suitably controlled by changing the type of the gelling agent used, the added amount of the gelling agent, and the type of the active beam-curable monomer.

The gel ink contains a crystalline gelling agent, a colorant, and a polymer dispersant.

The crystalline gelling agent is a component for imparting fluidity to the gel ink before ejection and for facilitating solidification of the gel ink after landing. One or more crystalline gelling agents may be used. If the content of the crystalline gelling agent in the gel ink is too low, the pinning of the gel ink may be weak so that undesired liquid gathering may occur when dots unite with each other. If the content of the crystalline gelling agent in the gel ink is too high, the pinning of the gel ink may be too strong, which may make it impossible to obtain dots with a sufficient size. From these points of view, the content of the crystalline gelling agent is preferably from 1 to 20% by mass, more preferably from 1 to 10% by mass, even more preferably from 2 to 7% by mass.

Examples of the crystalline gelling agent include fatty acid inulins such as stearic acid inulin, fatty acid dextrins such as palmitic acid dextrin and myristic acid dextrin, glyceryl behenate/eicosadioate, and polyglyceryl behenate/eicosadioate.

Examples of the crystalline gelling agent also include low-molecular-weight oil gelling agents such as those described in JP 2005-126507 A, JP 2005-255821 A, and JP 2010-111790 A, amide compounds such as N-lauroyl-L-glutamic acid dibutylamide and N-2-ethylhexanoyl-L-glutamic acid dibutylamide, and dibenzylidene sorbitols such as 1,3:2,4-bis-O-benzylidene-D-glycitol.

Examples of the crystalline gelling agent also include petroleum waxes such as paraffin wax, microcrystalline wax, and petrolatum, plant waxes such as candelilla wax, carnauba wax, rice wax, Japan wax, jojoba oil, jojoba solid wax, and jojoba esters, animal waxes such as beeswax, lanolin, and whale wax, mineral waxes such as montan wax and hydrogenated wax, hydrogenated castor oil or hydrogenated castor oil derivatives, montan wax derivatives, and modified waxes such as paraffin wax derivatives, microcrystalline wax derivatives, and polyethylene wax derivatives.

Examples of the crystalline gelling agent also include higher fatty acids such as behenic acid, arachidic acid, stearic acid, palmitic acid, myristic acid, lauric acid, oleic acid, and erucic acid, higher alcohols such as stearyl alcohol and behenyl alcohol, hydroxystearic acid such as 12-hydroxystearic acid or derivatives thereof, fatty acid amides such as lauric acid amide, stearic acid amide, behenic acid amide, oleic acid amide, erucic acid amide, ricinoleic acid amide, and 12-hydroxystearic acid amide, and N-substituted fatty acid amides such as N-stearylstearic acid amide and N-oleylpalmitic acid amide.

Examples of the crystalline gelling agent also include special fatty acid amides such as N,N'-ethylenebisstearylamide, N,N'-ethylenebis-12-hydroxystearylamide, and N,N'-xylylenebisstearylamide, higher amines such as dodecylamine, tetradecylamine, and octadecylamine, fatty acid ester compounds such as stearylstearic acid, oleylpalmitic acid, glycerin fatty acid esters, sorbitan fatty acid esters, propylene glycol fatty acid esters, ethylene glycol fatty acid esters, and polyoxyethylene fatty acid esters, sucrose fatty acid esters such as sucrose stearate and sucrose palmitate, synthetic gelling agents such as polyethylene gelling agents and α-olefin-maleic anhydride copolymer gelling agents, polymerizable gelling agents, dimer acids, and dimer diols.

One or more colorants may be used. If the content of the colorant in the gel ink is too low, the intensity of the gel ink color may be insufficient, and if the content of the colorant is too high, the other properties of the gel ink may be insufficient. From these points of view, the content of the colorant in the gel ink is preferably from 0.5 to 10% by mass, more preferably from 0.5 to 7% by mass, even more preferably from 1 to 5% by mass.

Examples of the colorant include pigments and dyes known to be useful as inkjet ink colorants. Examples of the pigments include the organic pigments and the inorganic pigments listed in the Color Index. Examples of the dyes include oil-soluble dyes.

The polymer dispersant may be of any type. Preferred examples of the polymer dispersant include BYK-2164, BYK-168, and BYK N-22024 manufactured by BYK, BYK JET-9150, BYK JET-9151, and EFKA 7701 manufactured by ALTANA, EFKA 4310, EFKA 4320, and EFKA 4401 manufactured by BASF, SOLSPERSE 24000GR and SOLSPERSE 39000 manufactured by Avecia, and AJISPER (a registered trademark of Ajinomoto Co., Inc.) PB821 and PB824 manufactured by Ajinomoto Fine-Techno Co., Inc.

In order to increase the dispersibility of pigments (colorants), the polymer dispersant preferably has a comb-shaped block structure ((comb-shaped) block copolymer skeleton). Among polymer dispersants, particularly the use of a polymer dispersant with a (comb-shaped) block copolymer skeleton, in which the side chain can stretch, makes it easy to obtain a steric hindrance effect for inhibiting the aggregation of pigments and thus makes it possible to further improve the dispersibility of pigments.

The content of the polymer dispersant is preferably from 20 to 70% by mass, more preferably from 25 to 60% by mass, even more preferably from 30 to 50% by mass, based on the pigment weight. This is because if the content of the polymer dispersant is too high based on the pigment weight, the polymer dispersant may associate with the gelling agent to inhibit the gelation, so that pinning may fail to work when the ink droplets are landed, and thus so-called liquid gathering, in which droplets spread and overlap, may occur to make the image quality insufficient. On the other hand, if the content of the polymer dispersant is too low based on the pigment weight, the polymer dispersant may fail to sufficiently cover the pigment surface, which may decrease the storage stability and also degrade the ejection stability so that good landing performance may fail to be achieved.

The gel ink may further contain an additional component other than the crystalline gelling agent, the colorant, and the polymer dispersant within ranges where the effects of the embodiment are brought about. Examples of such an additional component include a photo-polymerizable compound and a photopolymerization initiator.

The photo-polymerizable compound is a compound capable of being cured upon exposure to beams as described below. One or more photo-polymerizable compounds may be used. If the content of the photo-polymerizable compound in the gel ink is too low, the colorant may fail to be dispersed sufficiently, which may decrease the ability to eject the ink from the inkjet recording apparatus or may make insufficient the strength of the formed image (ink layer). If the content of the photo-polymerizable compound is too high, the content of the gelling agent or the photopolymerization initiator will be relatively low, which may provide the gel ink with insufficient other properties, such as insufficient sol-gel phase transition properties or insufficient curing properties. In order to provide the gel ink with the desired properties and to increase the strength of the image (ink layer), the content of the photo-polymerizable compound in the gel ink is preferably from 10 to 97% by mass, more preferably from 20 to 90% by mass, even more preferably from 30 to 85% by mass.

Examples of the photo-polymerizable compound include compounds having one or more radically-polymerizable unsaturated multiple bonds, more specifically, compounds having one or more (meth)acryloyl groups.

Examples of compounds having one (meth)acryloyl group include isoamyl (meth)acrylate, stearyl (meth)acrylate, lauryl (meth)acrylate, octyl (meth)acrylate, decyl (meth)acrylate, isomyristyl (meth)acrylate, isostearyl (meth) acrylate, 2-ethylhexyl-diglycol (meth)acrylate, 2-hydroxybutyl (meth)acrylate, 2-acryloyloxyethyl hexahydrophthalate, butoxyethyl (meth)acrylate, ethoxydiethylene glycol (meth)acrylate, methoxydiethylene glycol (meth)acrylate, methoxypolyethylene glycol (meth)acrylate, methoxypropylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth) acrylate, 2-hydroxy-3-phenoxypropyl (meth)acrylate, 2-acryloyloxyethyl succinate, 2-acryloyloxyethyl phthalate, 2-acryloyloxyethyl-2-hydroxyethyl-phthalate, lactone-modified (meth)acrylate, and tert-butylcyclohexyl (meth) acrylate.

Examples of compounds having two (meth)acryloyl groups include triethylene glycol di(meth)acrylate, tetraethylene glycol di(meth)acrylate, polyethylene glycol di(meth) acrylate, tripropylene glycol di(meth)acrylate, polypropylene glycol di(meth)acrylate, 1,4-butanediol di(meth) acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A-PO adduct di(meth)acrylate, hydroxypivalic acid neopentyl glycol di(meth)acrylate, and polytetramethylene glycol di(meth)acrylate.

Examples of compounds having three or more (meth) acryloyl groups include trimethylolpropane tri(meth)acrylate, pentaerythritol tri(meth)acrylate, pentaerythritol tetra (meth)acrylate, dipentaerythritol hexa(meth)acrylate, ditrimethylolpropane tetra(meth)acrylate, glycerol propoxide tri(meth)acrylate, caprolactone-modified trimethylolpropane tri(meth)acrylate, pentaerythritol ethoxytetra(meth) acrylate, and caprolactam-modified dipentaerythritol hexa (meth)acrylate.

In order to increase the strength of the ink layer, the active beam-curable compound preferably includes a compound having two or more (meth)acryloyl groups. For example, the content of the compound with two or more (meth)acryloyl groups in the active beam-curable compound is from 30 to 100% by mass.

The photopolymerization initiator is a component capable of initiating the beam-induced polymerization of the photopolymerizable compound. One or more photopolymerization initiators may be used. If the content of the photopolymerization initiator in the gel ink is too low, the photocuring may be insufficient, and if the content of the photopolymerization initiator is too high, the effect of the photopolymerization initiator will be saturated. From these points of view, the content of the photopolymerization initiator in the gel ink is preferably from 0.01 to 10% by mass, more preferably from 1 to 9% by mass, even more preferably from 5 to 8% by mass.

Examples of the photopolymerization initiator include acetophenone compounds, benzoin compounds, acylphosphine oxide compounds, benzil, and methylphenylglyoxyesters.

Examples of the acetophenone compounds include diethoxyacetophenone, 2-hydroxy-2-methyl-1-phenylpropan-1-one, benzyl methyl ketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexylphenylketone, 2-methyl-2-morpholino(4-thiomethylphenyl)propan-1-one, and 2-benzyl-2-dimethylamino-1-(4-morpholinophenyl)-butanone.

Examples of the benzoin compounds include benzoin, benzoin methyl ether, and benzoin isopropyl ether.

Examples of the acylphosphine oxide compounds include 2,4,6-trimethylbenzoindiphenylphosphine oxide.

Examples of the intramolecular hydrogen-withdrawing photopolymerization initiators include benzophenone compounds, thioxanthone compounds, aminobenzophenone compounds, 10-butyl-2-chloroacridone, 2-ethylanthraquinone, 9,10-phenanthrenequinone, and camphorquinone.

Examples of the benzophenone compounds include benzophenone, o-benzoylbenzoic acid methyl-4-phenylbenzophenone, 4,4'-dichlorobenzophenone, hydroxybenzophenone, 4-benzoyl-4'-methyl-diphenyl sulfide, acrylated benzophenone, 3,3',4,4'-tetra(tert-butylperoxycarbonyl)benzophenone, and 3,3'-dimethyl-4-methoxybenzophenone.

Examples of the thioxanthone compounds include 2-isopropylthioxanthone, 2,4-dimethylthioxanthone, 2,4-diethylthioxanthone, and 2,4-dichlorothioxanthone.

Examples of the aminobenzophenone compounds include Michler's ketone and 4,4'-diethylaminobenzophenone.

The printing step is performed so as to satisfy the formula shown below. In the formula, R is the resolution (dpi) of the image to be formed, and D is the diameter (μm) of ink droplet dots landed on the recording medium.

$$2.7 \leq D/(2.54 \times 10^4/R) \leq 3.5$$

If $D/(2.54 \times 10^4/R)$ (hereinafter also referred to as the "pixel dot ratio") is less than 2.7, a stripe defect may occur in the image formed at the first coverage rate. If the pixel dot ratio is more than 3.5, the formed image may have insufficient quality or the gel ink may be insufficiently cured or have insufficient adhesion to the recording medium. In order to form images with the desired quality, the pixel dot ratio is preferably from 2.9 to 3.3.

The pixel dot ratio can be calculated, for example, from the desired image resolution, the type of the recording medium to be used, the contact angle of the gel ink, and other parameters, or can be determined by experiments using an actual apparatus.

The inkjet image-forming method may further include additional steps other than the printing step within ranges where the effects of the embodiment are brought about. Examples of such additional steps include a defective nozzle identifying step, an ejection stopping step, a coverage rate controlling step, and a photo-curing step.

In the defective nozzle identifying step, a defective nozzle suffering ejection failure is identified from the plurality of nozzles. In the ejection stopping step, the ejection of the gel ink from the defective nozzle is stopped. These steps may be performed, for example, using a defective nozzle correction mechanism of a known inkjet image-forming apparatus.

In the coverage rate controlling step, the coverage rate for one or both of the nozzles adjacent to the defective nozzle is controlled to a second coverage rate greater than the first coverage rate. Subsequently, the adjacent nozzle or nozzles eject the gel ink at the second coverage rate onto the recording medium. The control to the second coverage rate may be performed for only one or both of the nozzles adjacent to the defective nozzle. In order to suppress image quality degradation, the control to the second coverage rate is preferably performed for both of the adjacent nozzles.

The second coverage rate is a minimum coverage rate that is set to allow the dots of the gel ink from the adjacent nozzle or nozzles to fill the blank that is formed on the recording medium due to the stop of the ejection of the gel ink from the defective nozzle, or the second coverage rate is a value more than the minimum coverage rate. The second coverage rate has an upper limit of 100%. The second coverage rates for both adjacent nozzles may be the same or different.

If the second coverage rate is too low, the defective nozzle-induced stripe defect may be insufficiently prevented in the formed image. If the second coverage rate is too high, the formed image may have insufficient quality. In order to prevent the stripe defect and to maintain the desired image quality, the second coverage rate is preferably from 1.1 to 2.0 times, more preferably from 1.3 to 1.8 tomes, even more preferably from 1.4 to 1.7 times the first coverage rate.

The coverage rate controlling step may be performed, for example, using the correction mechanism, which is designed to be able to control the coverage rate for any specific nozzle.

In the photo-curing step, beams are applied to the droplets of the gel ink landed on the recording medium to cure the gel ink on the recording medium, in which the gel ink contains the photo-polymerizable compound and the photopolymerization initiator. The beams are capable of inducing photopolymerization of the photo-polymerizable compound. The beams are, for example, ultraviolet rays or electron beams. The photo-curing step may be performed using a source of the beams placed downstream of the line inkjet head with respect to the recording medium feed direction in the line-head-type inkjet image-forming apparatus. Like the line inkjet head, the beam source may be fixed to apply the beams over the entire width of the image to be formed. Alternatively, the beam source may also be so placed that it can perform scanning in a direction crossing the feed direction.

The inkjet image-forming method can be performed using a known line-head-type inkjet image-forming apparatus having a defective nozzle correction mechanism capable of changing the coverage rates for both nozzles adjacent to any defective nozzle.

For example, provided is a line-head-type inkjet image-forming apparatus having defective nozzle correction means. Such a line-head-type inkjet image-forming apparatus may be, for example, the inkjet recording apparatus described in JP 2004-306261 A. The defective nozzle correction means may also be, for example, the ejection amount-changing means described in Patent Literature 1, which is designed to control the coverage rate for nozzles, instead of the ink ejection amount.

First, an image is formed by ejecting the ink from each nozzle under initial conditions satisfying the pixel dot ratio shown above. In this step, if the minimum dot diameter is selected from the selectable dot diameters in order to achieve the quality of the image to be formed, the coverage rate for each nozzle will be generally 100%. If the dot diameter is increased, the coverage rate for each nozzle will become less than 100%. If the dot diameter is excessively increased, the pixels will become coarse so that it will be impossible to achieve the desired image quality. The initial conditions can be determined by, for example, performing experiments with an actual apparatus, performing sensory evaluation on the resulting images, and taking into account the balance mentioned above. Under the initial conditions, images with the desired quality are formed with higher productivity without any image defects such as stripe defects.

Figure 1A:
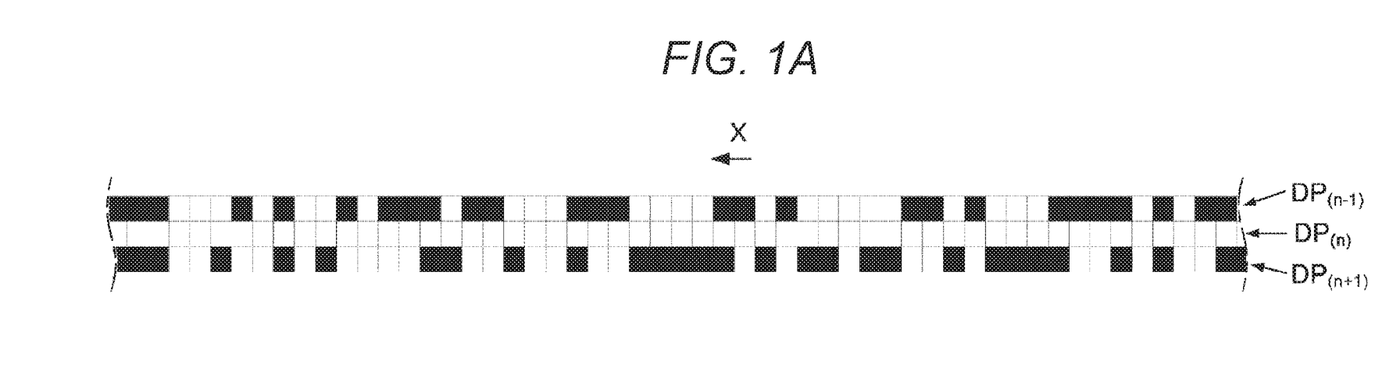
FIG. 1A is a diagram schematically showing dot patterns for the (n−1)th, n-th, and (n+1)th nozzles at the initial coverage rates when the ejection of gel ink from the n-th nozzle is stopped.

Under these circumstances, it is assumed that a defect such as clogging is detected for the n-th nozzle from one end of the inkjet nozzle head ($n \geq 1$). The defective nozzle correction means then stops the ejection of the ink from the n-th nozzle. FIG. 1A shows the dot patterns $DP_{(n-1)}$, $DP_{(n)}$, and $DP_{(n+1)}$ for the n-th nozzle and both nozzles adjacent thereto in this state. In the drawing, each square represents each pixel on the recording medium, and the filled squares represent the pixels to which the ink is to be ejected on the recording medium. The arrow X represents the recording medium feed direction.

Since the ejection of the ink from the n-th nozzle is stopped, the column of pixels for the n-th nozzle becomes blank. The dot patterns $DP_{(n-1)}$ and $DP_{(n+1)}$ for the (n−1)th and (n+1)th nozzles are to be formed under the initial conditions. If an image is formed in the dot patterns under the initial conditions while stopping the ejection of the ink from the n-th nozzle, a stripe defect will occur due to the stop of the ejection of the ink from the n-th nozzle.

Figure 1B:
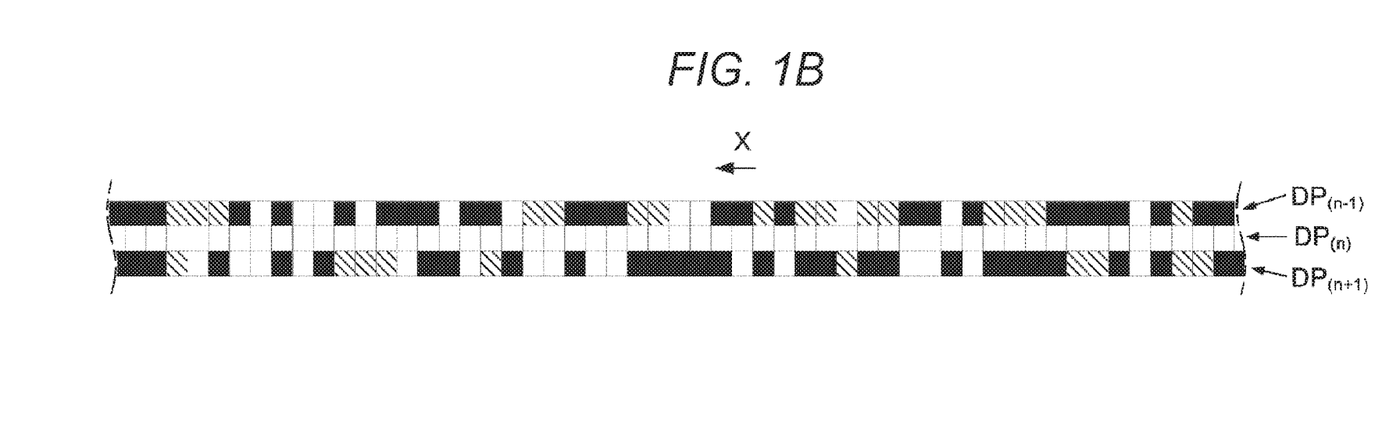
FIG. 1B is a diagram schematically showing dot patterns after corrections to the (n−1)th and (n+1)th nozzles.

Thus, as shown in FIG. 1B, the defective nozzle correction means increases the coverage rates for the (n−1)th and (n+1)th nozzles from those for the initial conditions. In FIG. 1B, the slashes indicate the pixels newly selected for the ejection of the ink at the increased coverage rates. Thus, the dots from both nozzles will fill the blank in the column of pixels for the n-th nozzle. Which pixels are to be selected for the additional ejection of the ink from the (n−1)th and (n+1)th nozzles can be determined, for example, in such a manner that the pixels that would otherwise originally be formed by printing with the ink ejected from the n-th nozzle can be formed by ink droplets landed at or near (n−1)th and (n+1)th pixel positions adjacent to the original pixels. In this process, the ink droplets to be ejected to the pixels for dealing with the n-th nozzle or pixels adjacent thereto or near thereof should be distributed in such a manner that the newly selected pixels will not overlap or connect with the originally selected pixels. This increase in the coverage rates for the (n−1)th and (n+1)th nozzles will prevent the occurrence of a stripe defect due to the stop of the ejection from the n-th nozzle, so that image formation with the desired quality can be continued.

In the above example, new dots are added to the dot patterns under the initial conditions for the (n−1)th and (n+1) the nozzles so that the coverage rates for both nozzles are increased. Alternatively, the (n−1)th and (n+1)th dot patterns after the correction may be partial modifications of the initial dot patterns or newly set dot patterns other than the initial dot patterns. In addition, the dot patterns in a region ranging from the (n−m)th column to the (n+m)th column ($n \geq 5$, $m \leq 4$) may also be changed so that further elimination of non-uniformity and further improvement of the image quality can be expected.

As is apparent from the above description, the inkjet image-forming method including forming an image by ejecting a gel ink at a first coverage rate from a plurality of nozzles arranged along a first direction to a recording medium moving in a second direction crossing the first direction, wherein the first coverage rate is less than 100% and set to allow dots of newly ejected gel ink to unite with dots of the gel ink already landed on the recording medium, makes it possible to more easily suppress the occurrence of image defects due to a failure of ejection of ink from nozzles, because of the following features: the gel ink includes a crystalline gelling agent, a colorant, and a polymer dispersant; the content of the polymer dispersant in the gel ink is from more than 20% by mass to 70% by mass based on the weight of the colorant; the gel ink has a contact angle Ga of 15 to 30° on the recording medium; and the inkjet image-forming method satisfies the following formula $$2.7 \leq D/(2.54 \times 10^4/R) \leq 3.5$$

In the formula, R is the resolution (dpi) of the image to be formed, and D is the diameter (μm) of ink droplet dots landed on the recording medium.

The inkjet image-forming method may further include the steps of: identifying a defective nozzle suffering ejection failure from the plurality of nozzles; stopping the ejection of the gel ink from the defective nozzle; and ejecting the gel ink to the recording medium after controlling the coverage rate for one or both of the nozzles adjacent to the defective nozzle to a second coverage rate greater than the first coverage rate. These steps are further effective in more easily suppressing the occurrence of image defects due to defective ejection of ink from nozzles.

In addition, the gel ink may have a phase transition point of 40° C. to less than 100° C. This feature is further effective in increasing the ejection stability and the accuracy of ink droplet landing.

In addition, the content of the crystalline gelling agent in the gel ink may be from 1 to 10% by mass. This feature is further effective in achieving the desired image quality through dot spreading.

The polymer dispersant may be at least one selected from the group consisting of polymer dispersants having a comb-shaped block structure. This feature is further effective in increasing dispersion stability and ejection stability.

The gel ink may further contain a photo-polymerizable compound and a photopolymerization initiator, and the inkjet image-forming method may further include the step of applying a beam to gel ink droplets landed on the recording medium to cure the gel ink on the recording medium. These additional features are further effective in forming highly durable images.

EXAMPLES

Hereinafter, examples of the present invention will be described.

[Preparation of Magenta Pigment Dispersion]

The components shown below were used to form magenta pigment dispersion 1.

Magenta pigment 1: D4500J (manufactured by BASF) 9.0 g

Photo-polymerizable compound: Tripropylene glycol diacrylate (manufactured by TOAGOSEI CO., LTD.) 32.7 g Polymer dispersant: BYK Jet-9151 (manufactured by ALTANA) 3.2 g Polymerization inhibitor: Irgastab UV-10 (manufactured by BASF, "IRGASTAB" is a registered trademark of BASF) 0.1 g The specified amounts of the above components were added to a 200 cc polyethylene bottle, to which 120 g of zirconia beads with a diameter of 0.5 mmφ were further added. After the bottle was capped, the components in the bottle were dispersed for 4 hours using a vibrating mill (Red Devil 4500L manufactured by NISHIMURA-SEI-SAKUSHO Co, Ltd.). After the dispersion, the beads were separated so that pigment dispersion 1 was obtained. Pigment dispersion 1 has a mass ratio (D/P) of polymer dispersant 1 (D) to the magenta pigment (P) of 0.35.

Pigment dispersions 2 and 3 were each obtained similarly to pigment dispersion 1, except that the D/P ratio was changed to 0.20 and 0.80, respectively.

[Preparation of Ink]

The photo-polymerizable compounds and the additives shown below were added in the amounts shown below to 20.0 g of pigment dispersion 1 being heated at 60° C. The resulting mixture was filtered through a 3-μm Teflon (registered trademark) membrane filter manufactured by ADVANTEC to give active beam-curable ink 1. In this regard, "IRGACURE" and "Darocure" are both registered trademarks of BASF.

Photo-polymerizable compound: Polyethylene glycol diacrylate (PEGDA) (manufactured by DAICEL-ALLNEX LTD.) 6.2 g Photo-polymerizable compound: 3PO-modified trimethylolpropane triacrylate (manufactured by TOAGOSEI CO., LTD.) 6.2 g Surfactant: TSF-4452 (manufactured by Shin-Etsu Chemical Co., Ltd.) 0.3 g Photopolymerization initiator: Irgacure 819 (manufactured by BASF) 0.3 g Photopolymerization initiator: DAROCURE TPO (manufactured by BASF) 0.3 g Crystalline gelling agent: KAO WAX T-1 (manufactured by Kao Corporation) 0.8 g Inks 2 and 3 were each obtained similarly to ink 1, except that pigment dispersions 2 and 3 were used, respectively, instead of pigment dispersion 1. Ink 4 was obtained similarly to ink 1, except that crystalline gelling agent 1 was replaced by the same amount of photo-polymerizable compound 1.

Ink 1 has a D/P ratio of the content D of polymer dispersant 1 to the content P of the magenta pigment of 0.35. Ink 2 has a D/P ratio of 0.20, ink 3 has a D/P ratio of 0.80, and ink 4 has a D/P ratio of 0.35.

The phase transition temperature (gelation temperature) Tpt of inks 1 to 3 was measured at a shear rate of 11 (1/s) using a viscoelastometer MCR300 manufactured by Physica. Inks 1 to 3 all had a Tpt of 59° C. Ink 4 did not gelate and thus had no detectable Tpt.

Example 1

Solid image 1 of 5 cm×5 cm was formed by ejecting ink 1 onto recording medium A using a line-head-type inkjet image-forming apparatus with the inkjet head temperature set to 80° C. The amount of the ink 1 droplet is 9 μL. The resolution R of the image to be formed is 1,200 dpi in the direction where the nozzles are arranged in the inkjet head. The dot of ink 1 landed on recording medium A has a diameter D of 65 μm.

The coverage rate Cr(n) for the n-th nozzle (e.g., the 100-th nozzle from one end) in the inkjet head is 50%, the coverage rate Cr(n−1) for the (n−1)th nozzle is 45%, and the coverage rate Cr(n+1) for the (n+1)th nozzle is 53%. The coverage rate is the proportion (%) of pixels on which the ink is actually landed from each nozzle in the pixel column on which printing is possible for each nozzle.

One second after ink 1 was landed on recording medium A, the contact angle of ink 1 on recoding medium A was determined using an automatic dynamic contact angle meter (model DCA-VZ) manufactured by Kyowa Interface Science Co., Ltd. As a result, the determined contact angle was 21°. Recording medium A is OK Top Coat (manufactured by Oji Paper Co., Ltd.).

Resulting solid image 1 was evaluated for stripe defect, cured properties, granularity, and adhesion.

(1) Stripe Defect

Solid image 1 was forced to contain nozzle missing parts by removing part at regular intervals from the image data in advance. The resulting image was visually observed and evaluated for stripe-like image defect based on the criteria below. When rated "A" or "B," the results are practically acceptable.

A: No stripe is visually observed at any part.

B: No white part is observed, but stripe-like irregularities are observed on some parts of the image surface.

C: Stripe-like white blanks are observed at some parts.

D: Stripe-like white blanks are observed at most parts.

(2) Cured Properties

Using the method according to JIS K 5701-1, 6.2.3 Abrasion Resistance Test, an appropriately-sized cut piece of the recording medium was placed on the solid image of 5 cm×5 cm, and then they were rubbed with each other under a load. Subsequently, how the image density decreased was visually observed and evaluated based on the criteria below. When rated "A" or "B," the results are practically acceptable.

A: No change is observed in the image even after rubbing at least 200 times.

B: No change is observed in the image even after rubbing at least 100 times.

C: A reduction in image density is observed after rubbing 100 times, but the reduction is within the practically acceptable range.

D: A clear reduction in image density is observed after rubbing less than 50 times, and the image quality is not practically acceptable.

(3) Granularity

A 10-step wedge image with a length of 50 mm was formed with the above resolution on a polyvinyl chloride recording medium JT5929PM (manufactured by MACtac). The wedge image was formed by evenly dividing the output signal into 10 levels from intensity 0 to the maximum intensity. The degree of the granularity of the second-, third-, and fourth-step parts of the resulting wedge image were visually observed from the lower density side and evaluated based on the criteria below. When rated "A" or "B," the results are practically acceptable.

A: Almost no granularity is observed.

B: Almost no granularity is observed at a distance of at least 30 cm from the image.

C: Granularity is observed even at a distance of at least 30 cm from the image, but the granularity is practically acceptable.

D: A practically unacceptable level of coarse granularity is observed even at a distance of at least 30 cm from the image.

(4) Adhesion

Solid image 1 was cross-cut into 10×10 squares with a side of 1 mm. Subsequently, a cellophane tape was attached to the image and then peeled off. The number of cut pieces (1-mm-side squares) separated from recording medium A was counted, from which the adhesion of the layer of ink 1 to recording medium A was evaluated based on the criteria below. When rated "A" or "B," the results are practically acceptable.

A: The number of separated cut pieces is zero.
B: The number of separated cut pieces is from 1 to 20.
C: The number of separated cut pieces is from more than 20 to 40.
D: The number of separated cut pieces is more than 40.

Examples 2 to 5

Solid images 2 and 3 were each formed and evaluated as in Example 1, except that the amount of the ink droplet was changed to 8.5 µL and 9.5 µL, respectively.

Solid image 3 was also formed and evaluated as in Example 1, except that recording medium A was replaced by recording medium B. Recording medium B was chrome-colored on one side (manufactured by Oji Paper Co., Ltd.). One minute after landing, ink 1 had a contact angle of 25° on recording medium B. Solid image 4 was also formed and evaluated as in Example 1, except that recording medium A was replaced by recording medium C. Recording medium C was Esprit C (manufactured by Nippon Paper Industries Co., Ltd.). One minute after landing, ink 1 had a contact angle of 28° on recording medium C.

Comparative Examples 1 to 3

Solid images C1 to C3 were formed and evaluated as in Example 1, except that recording medium A was replaced by recording media D, E, and F, respectively. Recording medium D is an adhesion promoter-treated PET film, recording medium E is Esprit F (manufactured by Nippon Paper Industries Co., Ltd.), and recording medium F is a high gloss paper sheet (manufactured by M-real Corporation). One minute after landing, ink 1 had contact angles of 10°, 32°, and 47° on recording media D, E, and F, respectively.

Comparative Examples 4 to 6

Solid images C4 to C6 were each formed and evaluated as in Example 1, except that ink 1 was replaced by inks 2 to 4, respectively. One minute after landing, inks 2, 3, and 4 had contact angles of 23°, 20°, and 13°, respectively, on recording medium A.

Comparative Example 7

Solid image C7 was formed and evaluated as in Example 1, except that the amount of the ink 1 droplet and the dot diameter were changed to 8 µL and 55 µm, respectively.

Comparative Example 8

Solid image C8 was formed and evaluated as in Example 1, except that the amount of the ink 1 droplet and the dot diameter were changed to 10 µL and 78 µm, respectively.

Example 6

Solid image 6 was formed and evaluated as in Example 1, except that that the amount of the ink 1 droplet, the dot diameter, and the resolution of the image to be formed were changed to 14 µL, 124 µm, and 600 dpi, respectively.

Table 1 shows the conditions of the inkjet image-forming method and the evaluation results in the examples and the comparative examples.

TABLE 1

| | Recording medium Type | Ink No. | Amount (pL) | D (µm) | R (dpi) | $2.54 \times 10^4/R$ | $D/(2.54 \times 10^4/R)$ | Stripe defect | Cured properties | Granularity | Adhesion |
|---|---|---|---|---|---|---|---|---|---|---|---|
| Example 1 | A | 1 | 9.0 | 65 | 1200 | 21.2 | 3.07 | A | A | A | A |
| Example 2 | A | 1 | 8.5 | 60 | 1200 | 21.2 | 2.83 | B | A | A | A |
| Example 3 | A | 1 | 9.5 | 70 | 1200 | 21.2 | 3.30 | A | A | A | A |
| Example 4 | B | 1 | 9.0 | 63 | 1200 | 21.2 | 2.97 | A | A | A | A |
| Example 5 | C | 1 | 9.0 | 61 | 1200 | 21.2 | 2.88 | A | A | A | A |
| Comparative Example 1 | D | 1 | 9.0 | 77 | 1200 | 21.2 | 3.63 | A | A | D | A |
| Comparative Example 2 | E | 1 | 9.0 | 57 | 1200 | 21.2 | 2.69 | C | B | C | B |
| Comparative Example 3 | F | 1 | 9.0 | 44 | 1200 | 21.2 | 2.08 | D | D | D | D |
| Comparative Example 4 | A | 2 | 9.0 | 63 | 1200 | 21.2 | 2.97 | D | A | B | A |
| Comparative Example 5 | A | 3 | 9.0 | 62 | 1200 | 21.2 | 2.92 | C | A | B | A |
| Comparative Example 6 | A | 4 | 9.0 | 80 | 1200 | 21.2 | 3.77 | A | D | D | D |
| Comparative Example 7 | A | 1 | 8.0 | 55 | 1200 | 21.2 | 2.59 | C | A | A | A |
| Comparative Example 8 | A | 1 | 10.0 | 78 | 1200 | 21.2 | 3.69 | A | C | D | C |
| Example 6 | A | 1 | 14.0 | 124 | 600 | 42.3 | 2.93 | A | A | B | A |

Example 7

Solid image 7 was formed and evaluated for stripe defect as in Example 1, except that the ejection of ink 1 from the n-th nozzle was stopped, the coverage rate for the (n−1)th nozzle was changed from 45% to 75%, and the coverage rate for the (n+1)th nozzle was changed from 53% to 72%.

Comparative Example 9

Solid image C9 was formed and evaluated for stripe defect as in Example 1, except that the ejection of ink 1 from the n-th nozzle was stopped.

Comparative Example 10

Solid image C10 was formed and evaluated for stripe defect as in Example 7, except that recording medium A was replaced by recording medium F.

Comparative Example 11

Solid image C11 was formed and evaluated for stripe defect as in Comparative Example 9, except that recording medium A was replaced by recording medium F.

Example 8

Solid image 8A was formed as in Example 1, except that the coverage rates for the (n−1)th, n-th, and (n+1)th nozzles were 34%, 50%, and 62%, respectively. In this way, it was checked that the solid image was successfully formed at the above coverage rates.

Subsequently, the ejection of ink 1 from the n-th nozzle was stopped, the coverage rate for the (n−1)th nozzle was changed from 34% to 49%, and the coverage rate for the (n+1)th nozzle was changed from 39% to 62%. Solid image 8B was formed under these conditions and then evaluated for stripe defect.

Comparative Example 12

Solid image C12 was formed and evaluated for stripe defect similarly to image 8A in Example 8, except that the ejection of ink 1 from the n-th nozzle was stopped.

Table 2 shows the coverage rates and the results of stripe defect evaluation in Examples 7 and 8 and Comparative Examples 9 to 12.

Table 1 shows that the results of the evaluation in Examples 1 to 6 are good enough with respect to all of stripe defect, cured properties, granularity, and adhesion. This may be because of the following three reasons: (1) in the line-head-type inkjet image-forming method, the gel ink is ejected at a coverage rate suitable to allow new dots to unite with already provided dots and also ejected so as to form dots with a diameter suitable for the resolution; (2) the gel ink contains a sufficient amount of a polymer dispersant based on the amount of the colorant; and (3) the gel ink has a suitable contact angle on the recording medium.

In addition, Table 2 shows that the results of the evaluation in Examples 7 and 8 are good enough with respect to all of stripe defect, cured properties, granularity, and adhesion both before and after the stop of the ejection of ink from the n-th nozzle. These results are owing to the fact that after the stop of the ejection of ink from the n-th nozzle, the coverage rates for both adjacent nozzles are increased appropriately, in addition to the feature (1) above.

In contrast, the result of the evaluation in Comparative Example 1 is unsatisfactory with respect to granularity. This may be because ink 1 has too small a contact angle on recording medium D and thus can smear significantly and form dots with a diameter too large for the pixels.

The results of the evaluation in Comparative Example 2 are unsatisfactory with respect to stripe defect and granularity, and the results of the evaluation in Comparative Example 3 are unsatisfactory with respect to all of stripe defect, cured properties, granularity, and adhesion. This may be because in Comparative Examples 2 and 3, ink 1 has too large a contact angle on recording media E and F, respectively, and thus can form protruding dots with a diameter too small for the pixels. It is also suggested that in Comparative Example 3, the protrusion of dots can lead to unsatisfactory results with respect to granularity and also lead to poor curing of ink 3 and lower adhesion of ink 3 to recording medium F.

In Comparative Example 4, the result of the evaluation is unsatisfactory with respect to stripe defect. This may be because ink 2 has too low a DIP ratio, which can lead to insufficient dispersibility of the magenta pigment, insufficient stability of ejection of ink 2, and thus insufficient ink-landing accuracy.

Also in Comparative Example 5, the result of the evaluation is unsatisfactory with respect to stripe defect. This may be because ink 3 has too high a D/P ratio and too high a

TABLE 2

| | Recording | Ink | | | | | Coverage rate (%) for nozzles | | | | |
| | | | | | | | (n − 1)th | | (n + 1)th | | |
| | medium Type | No. | Amount (pL) | D (µm) | R (dpi) | D/(2.54 × 10$^4$/R) | Before stopping | After stopping | Before stopping | After stopping | Stripe defect |
|---|---|---|---|---|---|---|---|---|---|---|---|
| Example 7 | A | 1 | 9.0 | 65 | 1200 | 3.07 | 45 | 75 | 53 | 72 | A |
| Comparative Example 9 | A | 1 | 9.0 | 65 | 1200 | 3.07 | 45 | 45 | 53 | 53 | D |
| Comparative Example 10 | F | 1 | 9.0 | 44 | 1200 | 2.08 | 45 | 75 | 53 | 72 | D |
| Comparative Example 11 | F | 1 | 9.0 | 44 | 1200 | 2.08 | 45 | 45 | 53 | 53 | D |
| Example 8 | A | 1 | 9.0 | 65 | 1200 | 3.07 | 34 | 49 | 39 | 62 | A |
| Comparative Example 12 | A | 1 | 9.0 | 65 | 1200 | 3.07 | 34 | 34 | 39 | 39 | D | viscosity, which can lead to insufficient stability of ejection of ink 3 and thus insufficient ink-landing accuracy.

In Comparative Example 6, the results of the evaluation are unsatisfactory with respect to all of cured properties, granularity, and adhesion. This may be because ink 4 is a non-gel ink containing no crystalline gelling agent, which cannot bring about gel ink-specific effects (improvements in cured properties, granularity, and adhesion) although it will not cause stripe defects.

In Comparative Example 7, the result of the evaluation is unsatisfactory with respect to stripe defect. This may be because the diameter of ink 1 dots formed at the initial coverage rate is too small for the pixels.

In Comparative Example 8, the results are unsatisfactory with respect to all of cured properties, granularity, and adhesion. This may be because the dot diameter is too large for the pixels.

In Comparative Examples 9 and 12, the results of the evaluation are unsatisfactory with respect to stripe defect. This may be because when neither the coverage rate nor the amount of ejection is controlled, the dots from the (n±1)th nozzles cannot sufficiently fill the blank formed on the recording medium due to the failure of the n-th nozzle.

In both of Comparative Examples 10 and 11, the results of the evaluation are unsatisfactory with respect to stripe defect. This may be because the ink dot diameter is too small for the pixels, so that the occurrence of stripe defects cannot be prevented even though the coverage rage is increased when a defective nozzle is detected.

For example, it is apparent from the above description that the line-head-type inkjet image-forming method including forming an image by ejecting a gel ink at a first coverage rate that is less than 100% and set to allow dots of newly ejected gel ink to unite with dots of the gel ink already landed on the recording medium can successfully form an image with a sufficient level of cured properties and adhesion of the ink without any stripe or granular defect, when the gel ink includes a crystalline gelling agent, a colorant, and a polymer dispersant, the content of the polymer dispersant in the gel ink is from more than 20% by mass to 70% by mass based on the weight of the colorant, the gel ink has a contact angle of 15 to 30° on the recording medium, and the method satisfies the formula shown below.

It is also apparent from the above description that for example, when a defective nozzle suffering ejection failure occurs among a plurality of nozzles, the occurrence of stripe defects due to the occurrence of the defective nozzle can be successfully prevented by stopping the ejection of the gel ink from the defective nozzle and ejecting the gel ink at a second coverage rate, which is higher than the first coverage rate, to the recording medium from one or both of the nozzles adjacent to the defective nozzle.

INDUSTRIAL APPLICABILITY

According to the image-forming method of the present invention, images can be formed with higher productivity by a line-head-type inkjet image-forming method in which images are formed by one pass of the recording medium. According to the image-forming method of the present invention, the occurrence of stripe defects due to nozzle failure can also be prevented by an easier method, namely, by controlling the coverage rate for nozzles. Thus, the present invention can be expected to contribute to further spreading of line-head-type inkjet image-forming methods using gel ink in the printing industry, which is required to form high-quality images with high productivity.

The invention claimed is:

1. An inkjet image-forming method comprising:
    forming an image by ejecting a gel ink at a first coverage rate from a plurality of nozzles arranged along a first direction to a recording medium moving in a second direction crossing the first direction,
    the first coverage rate being less than 100% and set to allow dots of newly ejected gel ink to unite with dots of the gel ink already landed on the recording medium,
    the gel ink containing a crystalline gelling agent, a colorant, and a polymer dispersant,
    a content of the polymer dispersant in the gel ink being from more than 20% by mass to 70% by mass based on a weight of the colorant,
    the gel ink having a contact angle of 15 to 30° on the recording medium,
    the inkjet image-forming method satisfying the following formula:

$$2.7 \leq D/(2.54 \times 10^4/R) \leq 3.5$$

wherein R is a resolution (dpi) of the image to be formed, and D is a diameter (μm) of ink droplet dots landed on the recording medium.

2. The inkjet image-forming method according to claim 1, further comprising
    a step of applying a beam to ink droplets landed on the recording medium to cure the gel ink on the recording medium, wherein
    the gel ink further contains a photo-polymerizable compound and a photopolymerization initiator.

3. The inkjet image-forming method according to claim 1, further comprising the steps of:
    identifying a defective nozzle suffering ejection failure from the plurality of nozzles;
    stopping ejection of the gel ink from the defective nozzle; and
    ejecting the gel ink to the recording medium after controlling the coverage rate for one or both of nozzles adjacent to the defective nozzle to a second coverage rate greater than the first coverage rate.

4. The inkjet image-forming method according to claim 3, wherein the gel ink has a phase transition point of 40° C. to less than 100° C.

5. The inkjet image-forming method according to claim 3, wherein a content of the crystalline gelling agent in the gel ink is from 1 to 10% by mass.

6. The inkjet image-forming method according to claim 3, wherein the polymer dispersant is at least one selected from the group consisting of polymer dispersants having a comb-shaped block structure.

7. The inkjet image-forming method according to claim 3, further comprising
    applying a beam to ink droplets landed on the recording medium to cure the gel ink on the recording medium, wherein
    the gel ink further contains a photo-polymerizable compound and a photopolymerization initiator.

8. The inkjet image-forming method according to claim 1, wherein the gel ink has a phase transition point of 40° C. to less than 100° C.

9. The inkjet image-forming method according to claim 8, wherein a content of the crystalline gelling agent in the gel ink is from 1 to 10% by mass.

10. The inkjet image-forming method according to claim 8, wherein the polymer dispersant is at least one selected from the group consisting of polymer dispersants having a comb-shaped block structure.

11. The inkjet image-forming method according to claim 8, further comprising
applying a beam to ink droplets landed on the recording medium to cure the gel ink on the recording medium, wherein
the gel ink further contains a photo-polymerizable compound and a photopolymerization initiator.

12. The inkjet image-forming method according to claim 1, wherein a content of the crystalline gelling agent in the gel ink is from 1 to 10% by mass.

13. The inkjet image-forming method according to claim 12, wherein the polymer dispersant is at least one selected from the group consisting of polymer dispersants having a comb-shaped block structure.

14. The inkjet image-forming method according to claim 12, further comprising
applying a beam to ink droplets landed on the recording medium to cure the gel ink on the recording medium, wherein
the gel ink further contains a photo-polymerizable compound and a photopolymerization initiator.

15. The inkjet image-forming method according to claim 1, wherein the polymer dispersant is at least one selected from the group consisting of polymer dispersants having a comb-shaped block structure.

16. The inkjet image-forming method according to claim 15, further comprising
applying a beam to ink droplets landed on the recording medium to cure the gel ink on the recording medium, wherein
the gel ink further contains a photo-polymerizable compound and a photopolymerization initiator.

* * * * *